United States Patent [19]

Roze

[11] Patent Number: 4,925,027

[45] Date of Patent: May 15, 1990

[54] CASSETTE CONTAINER

[76] Inventor: Paul F. Roze, 8, rue de la Lande Seche, Cesson-Sevigne, France, 35510

[21] Appl. No.: 350,439

[22] Filed: May 11, 1989

[51] Int. Cl.$^5$ ............................................ A47B 81/06
[52] U.S. Cl. ..................................... 206/387; 312/15; 312/319
[58] Field of Search .................... 206/387, 444; 312/9, 312/10, 11, 12, 13, 14, 15, 18, 319

[56] References Cited

U.S. PATENT DOCUMENTS

| | | | |
|---|---|---|---|
| 2,615,772 | 10/1952 | Bradley | 312/15 |
| 3,995,737 | 12/1976 | Ackeret | 206/387 |
| 4,162,112 | 7/1979 | Konkler | 312/15 |
| 4,235,490 | 11/1980 | Schwartz et al. | 312/15 |
| 4,270,817 | 6/1981 | McRae | 312/15 |
| 4,369,883 | 1/1983 | Stravitz | 206/387 |
| 4,724,957 | 2/1988 | Burgschweiger | 206/387 |

Primary Examiner—Paul T. Sewell
Assistant Examiner—Jacob K. Ackun, Jr.
Attorney, Agent, or Firm—Pollock, Vande Sande & Priddy

[57] ABSTRACT

A storage container for cassettes includes an opened top casing member with a cover pivotally connected to one side wall of the casing member and adapted to close the storage compartment. A plurality of parallel, spaced-apart retaining members are provided in the storage space, and define therebetween allocated storage spaces for receiving the cassettes therein. Flexible pushing means are operatively associated with each of the allocated storage spaces for facilitating removal of the items from the storage spaces. The entire storage assembly is formed as a book-like assembly arrangement.

10 Claims, 3 Drawing Sheets

CASSETTE CONTAINER

TECHNICAL FIELD

The present invention relates to a handy storage arrangement or storage container for a plurality of items, such as cassettes.

BACKGROUND OF THE INVENTION

It has been known to provide various storage containers for organized storage of a plurality of items such as records, discs and cassettes. Such containers usually comprise some kind of a box, casing or frame, defining a storage compartment, which in turn includes a plurality of allocated spaces for receiving therein the individual items to be stored.

Collectors of, for example, music cassettes usually have to store a large number of cassettes in a convenient and easily identifiable manner. Since it is important that the storage containers for such items be relatively compact, the items stored have to be positioned close to each other. It becomes quite difficult, however, to remove such items from the closely positioned storage spaces, particularly when the storage container is filled with cassettes, or the like.

It is also important to provide a convenient way of storing such storage containers themselves. The inventor has discovered that provision of a book-like assembly over a container to obtain a book-like arrangement is very advantageous. The arrangement provides convenient retention of the book-like arrangement, for example, on a library shelf.

SUMMARY OF THE INVENTION

The present invention is directed to improving the storage arrangement for a plurality of items, such as cassettes, from the point of view of convenience of use and simplicity in manufacturing costs.

In accordance with the invention, a prime component of the storage container is an opened-top casing member including a bottom wall, a pair of side walls and a pair of end walls, which all define an interior storage compartment. A top cover member is hinged to one side wall of the casing member and adapted to close the storage compartment.

In the interior storage compartment, a plurality of parallel, spaced-apart retaining members are provided. The retaining members define therebetween a plurality of allocated storage spaces, with each storage space being adapted for receiving therein an item to be stored. A flexible pushing means is operativelY associated with each of the allocated storage spaces for facilitating removal of the items from the storage space.

In one preferred embodiment of the present invention, a pair of insert members is supported inside the storage compartment, one of the inserts being placed along the opposite one of the side walls of the casing member. Each insert includes at least one partition wall which extends substantially parallel and spaced-apart from one of the side walls of the casing member.

In the preferred embodiment, the flexible pushing means includes a simple string which is provided in each of the allocated storage spaces and has one end secured to a partition wall of one of the inserts. The string is adapted to extend along the bottom wall underneath the inserted cassette and then upwardly through an aperture provided in the partition wall of the other insert. The opposite free end of the string projects outside the insert such that it can be easily reachable by the user's fingers and pulled upwardly, such that a selected cassette is raised above the height of the other cassettes, and can therefore be easily removed from its storage space.

The above structure provides a convenient means for removing the individual cassettes from a relatively compact container in which a pluralitY of spaced-apart cassettes are held closely next to each other.

The container, in accordance with the present invention, also includes a book-like assembly surrounding the container. The book-like assembly includes at least a pair of rigid, generally planar members and a hinge member adjoining the rigid planar members into a book-like assembly and providing for rotational movement of the rigid planar members relative to each other about a longitudinal axis of the hinge. The book-like assembly has its planar members secured respectively to the top cover and the bottom wall of the casing and a hinge member extends therebetween along one of the side walls of the casing.

Also, means are provided for convenient description and identification of the item being stored in the container storage spaces.

The above structure provides a storage container for cassettes which is compact, convenient to store, allows easy removal of the items from the container, and is simple and inexpensive to manufacture.

BRIEF DESCRIPTION OF THE DRAWINGS

The present invention will now be described in the following portions of the specification so that, when taken in conjunction with the attached drawings, those skilled in the art can readily make and use the cassette container of the invention. In the drawings, like reference characters identify identical apparatus and, more particularly.

DETAILED DESCRIPTION OF THE PREFERRED EMBODIMENT(S)

Figure 1:
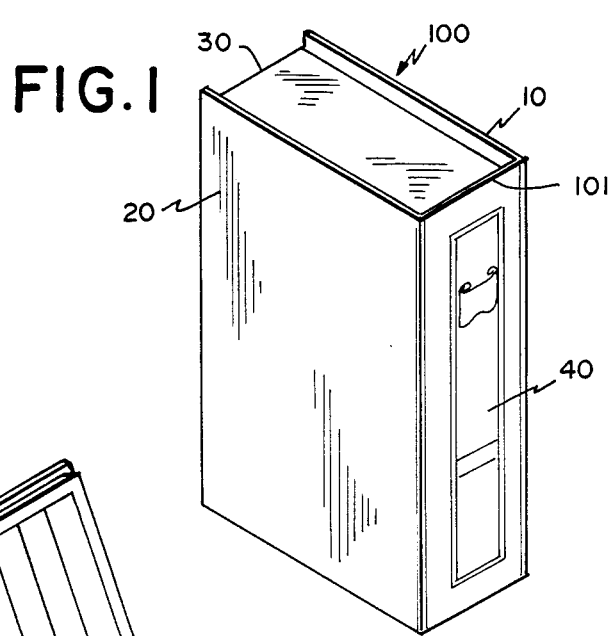
FIG. 1 is an isometric view of the container of the present invention in a closed condition.
Figure 2:
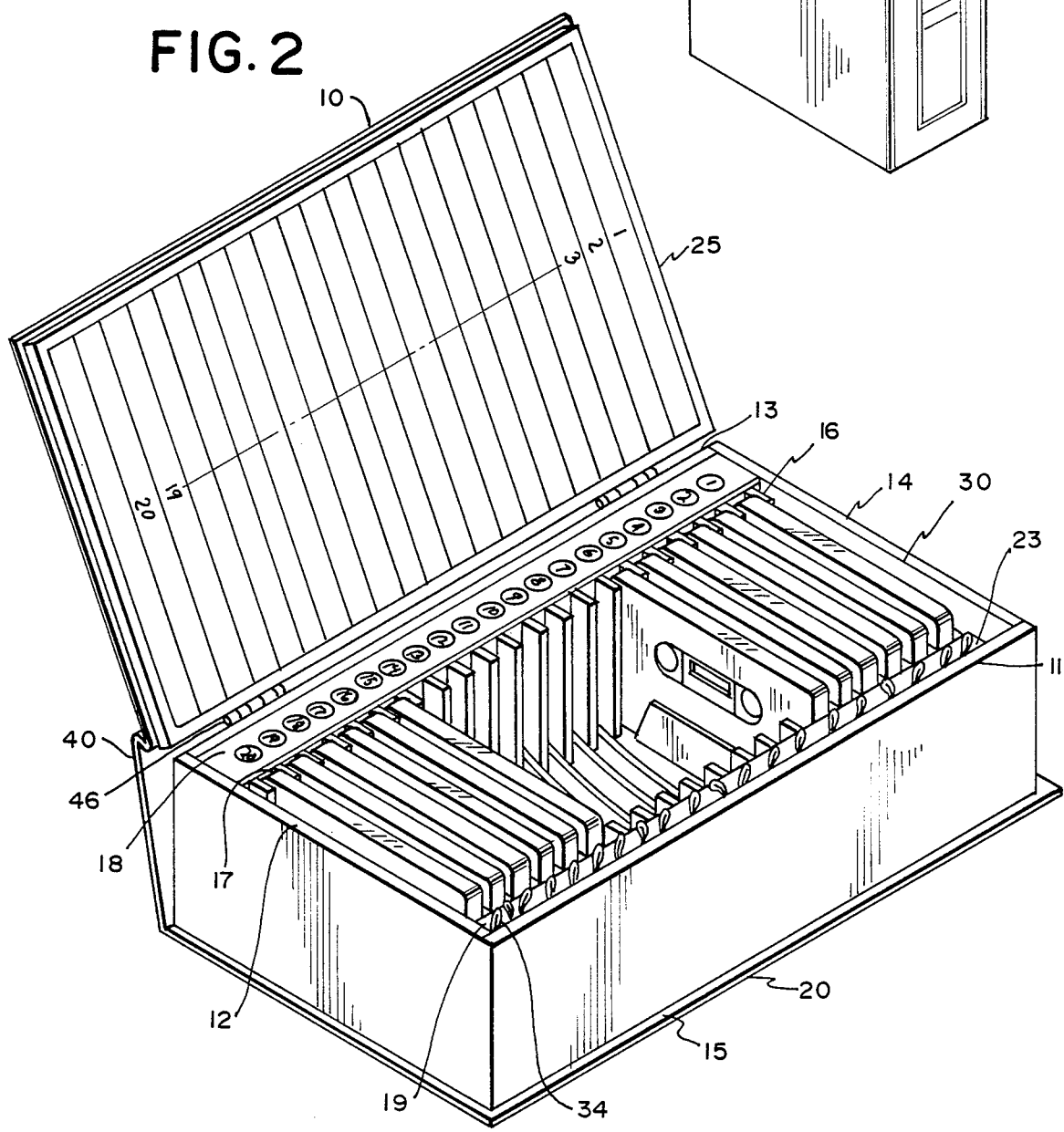
FIG. 2 is a top view of the container of the present invention in a completely opened condition.

The cassette container of the present invention 100 is illustrated in isometric views in FIGS. 1 and 2 where the container is shown closed in FIG. 1 and open in FIG. 2. More particularly, as will be seen in FIG. 2, the present invention includes an opened-top casing 30 which has a pair of side walls 11, 13 and a pair of end walls 14, 12 all of which are connected to a bottom wall 15. The casing 30 defines an interior storage compartment therein.

The storage compartment is divided into a plurality of allocated storage spaces 17 for receiving items to be stored therein. In the preferred embodiment shown in FIG. 2, there are 20 allocated storage spaces.

The storage compartment can be closed by a top cover 25 which is hinged by hinge means 46 to one of the side walls of the casing 30.

In the preferred embodiment, the casing 30 is rectangular, and the top cover member 25 has dimensions equal to those of the bottom wall 15. As best shown in FIGS. 1 and 2, a book-like assembly 101 is provided to cover the exterior surfaces of the casing 30 and the top cover 25 to obtain a book-like storage container arrangement. The book-like assembly 101 includes two substantially rectangular, rigid, planar members 10, 20, each having dimensions larger than those of the bottom wall 15 of the casing 10 and the top cover 25. The planar members are secured, for example by gluing, to the outer surfaces of the bottom wall 15 and cover 25 and a hinge member 40 is provided therebetween which facilitates the opening of the top cover 25 constituting the cover of the book-like arrangement.

Figure 3:
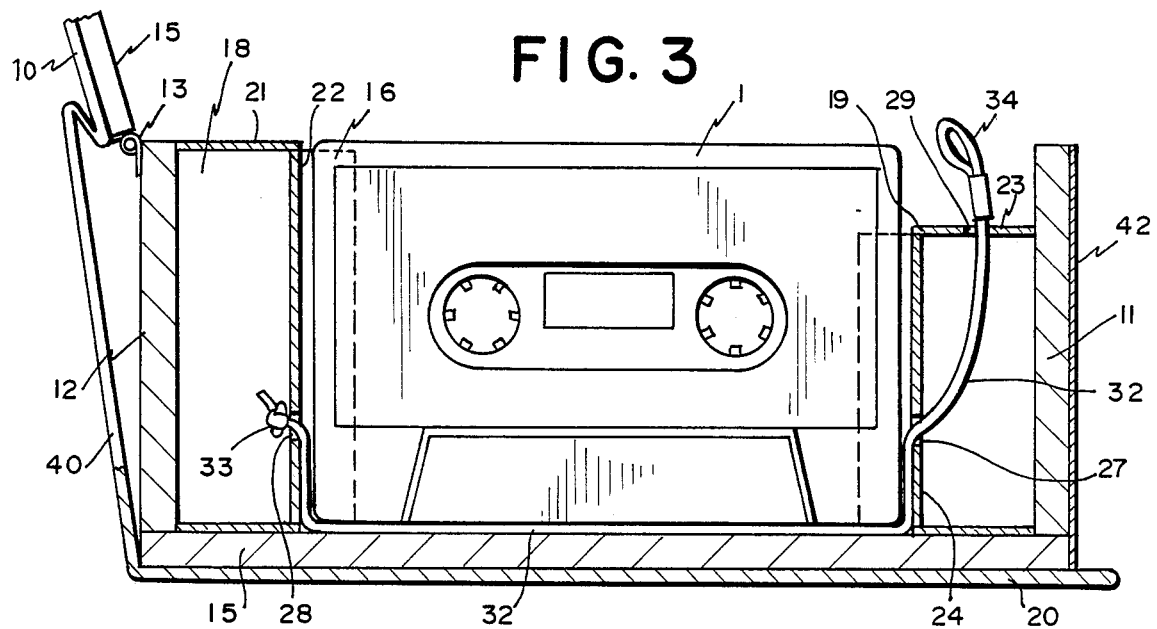
FIG. 3 is a cross-sectional view of the container of the present invention with a cassette in a stored position.
Figure 4:
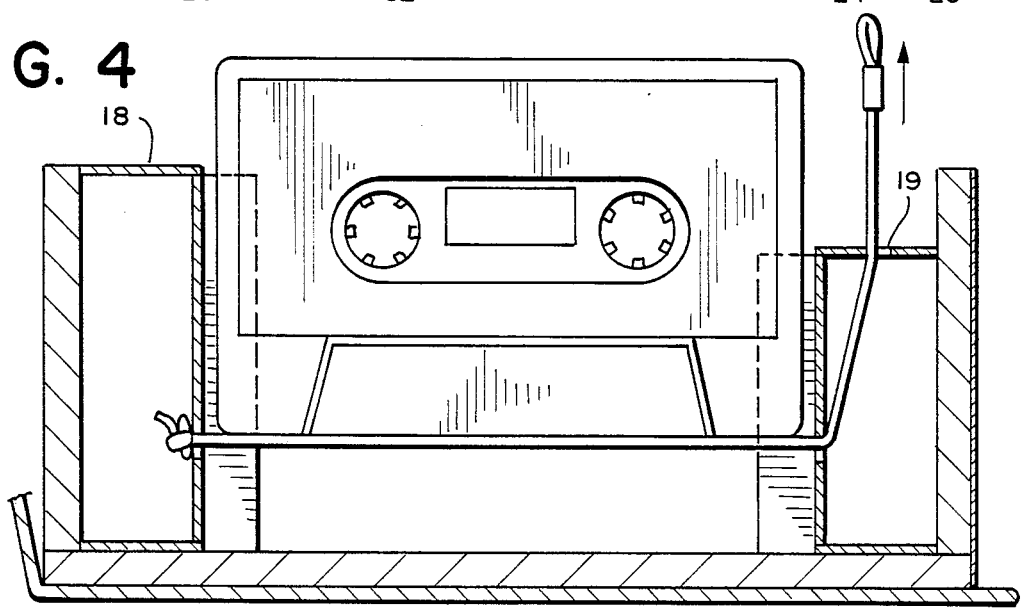
FIG. 4 is a view similar to that of FIG. 3 with a cassette in a withdrawn position.
Figure 5:
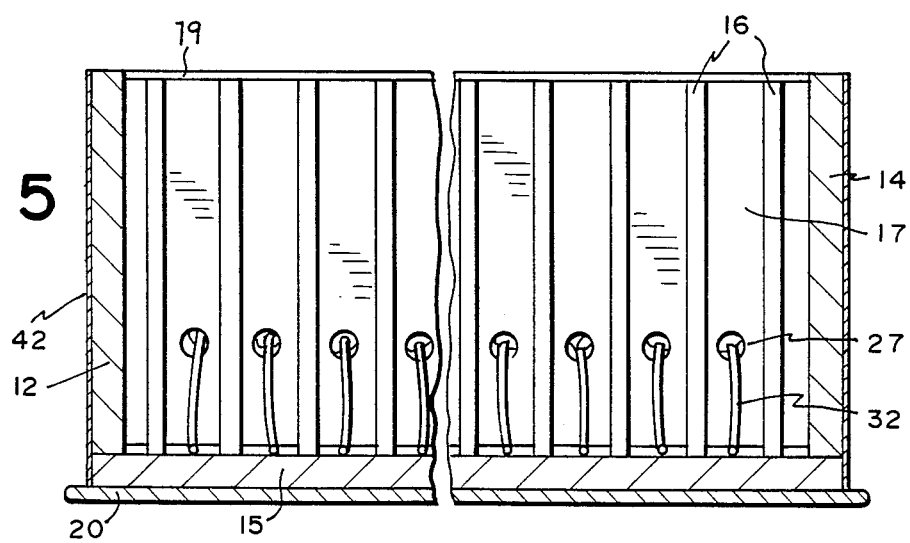
FIG. 5 is a section of FIG. 2.

As best shown in FIGS. 3-5, a pair of inserts 18, 19 is provided in the storage space. One of the inserts is respectively provided along the opposite one of the side walls 11, 12 of the casing member 30 at a distance therefrom. Each insert 18, 19 includes at least one partition wall 22, 24 which extends parallel to and spaced-apart from one of the side walls of the casing member. In addition, the inserts can be provided with at least one horizontal wall 21, 23 which is adapted to cover the space formed between the side wall of the casing and the partition wall of the insert. In the preferred embodiment shown in FIGS. 3-5, the two inserts are U-shaped.

A plurality of retaining members 16 is affixed along the side partition walls and spaced-apart from each other. The two adjacent retaining members on one insert and two corresponding adjacent retaining members on the other insert define together a single, allocated storage space 17. In the preferred embodiment, a pushing means 32, associated with every allocated storage space 17, includes a simple string. As shown in FIG. 3, one end of the string is held securely to the partition wall 22 of the insert 18. One way to secure the string is to pass the end of the string through an aperture in the partition wall and make a knot. The string has a length sufficient to extend substantially downwardly along the partition wall, along the bottom wall 15 of the casing 30, underneath the inserted cassette 1, and then upwardly through an aperture 27 in the partition wall 24 of the second insert 17 and upwardly through an opening 29 in the horizontal wall 23 of the second insert. The second end of the string includes a pulling means 34 easily reachable by the fingers. The first insert 18 is substantially aligned with the top edges of the casing walls. The second insert 19 has a lower height, such that in the closed position of the storage container, the pulling means of the string can be easily accommodated underneath the top cover.

As shown from FIGS. 3 and 4, the aperture in the second insert 19 is positioned substantially at the level at which the string is attached to the first partition wall. In operation, in order to remove an individual cassette from the storage container, one simply has to pull the pulling end 34 of the string upwardly, and the cassette is raised to the level shown in FIG. 4, such that it can be easily retrieved from the allocated space in the container.

Figure 6:
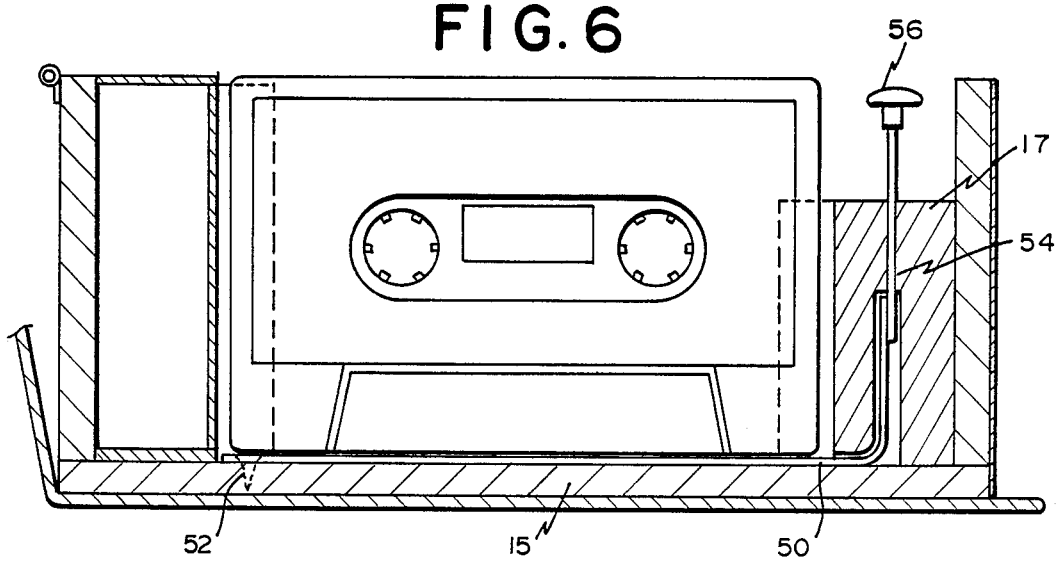
FIG. 6 is a cross-sectional view of another embodiment of the container of the present invention with a cassette in a stored position.
Figure 7:
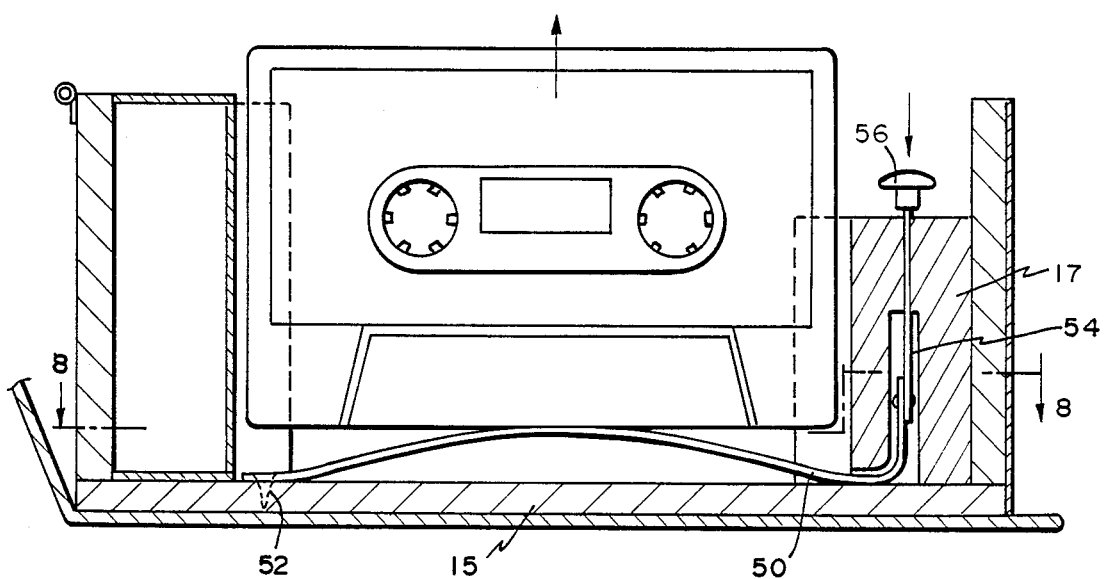
FIG. 7 is a view similar to that of FIG. 6 with a cassette in a withdrawn position.
Figure 8:
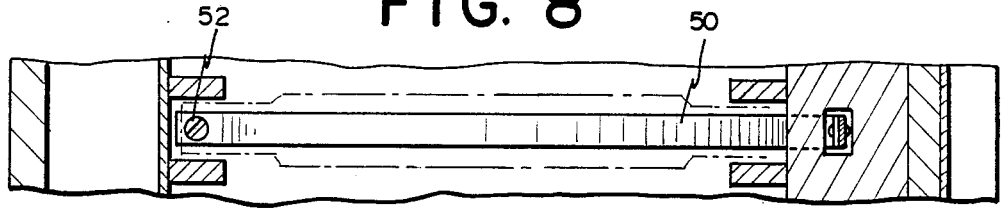
FIG. 8 is a section taken along the lines 8-8' of FIG. 7.

FIGS. 6-8 show another embodiment of the storage container according to the invention in which pushing means 32 includes a spring-like member 50 which has one end fixed to the bottom wall 15 of the casing 30, for example by screw 52. The spring-like member 50 extends along the bottom wall 15 underneath an inserted item and then upwardly through the second insert 17.

The opposite end of the spring-like member 50 is connected to a rigid rod 54 which extends upwardly from the second insert 17. The rod 54 may be provided with a button 56. Upon application of pressure by pushing the button 56 of the rod 54 downwardly, the spring-like member will bend upwardly as shown in FIG. 7 causing the chosen cassette to pop up, such that it will emerge partly above other cassettes and become easily accessible.

The spring-like member can be made, for example, as a narrow, plastic or metallic blade.

The casing of the storage container and planar members 10, 20 may be formed of any of a variety of materials, such as metal, wood, plastic, etc. In the embodiment actually constructed, these elements are made of wood. The planar members and a hinge member of the book-like assembly may be covered by a cover layer made of fabric, plastic, leather, etc.

As best shown in FIG. 2, each storage space is identified with a numeral provided on the horizontal wall 21 of the insert 18. Also, means are provided on the inner surface of the top cover 25 for a simple identification of the item stored in all storage spaces It should be apparent that many changes can be made within the spirit and scope of the invention which can be construed in accordance with the following claims.

I claim:

1. A storage container for a plurality of items, such as cassettes comprising:
   an open-top casing member including a bottom wall, a pair of side walls, and a pair of end walls and defining an interior storage compartment;
   a top cover member pivotably connected to one side wall of said casing member and adapted to close said storage compartment;
   first and second insert members disposed within said storage compartment, each of said insert members being supported along a side wall of said casing member, and each of said insert members having a partition wall extending parallel to and spaced from the adjacent side wall of said casing member, each of said partition walls having a top edge and a bottom edge;
   a plurality of parallel, spaced-apart retaining members provided in said storage compartment and defining therebetween a plurality of allocated storage spaces in said storage compartment, each storage space being adapted for receiving therein an item to be stored; and
   string means operatively associated with each of said allocated storage spaces for facilitating removal of the items from said storage spaces one end of said string means being secured to the partition wall of said first insert member at a position intermediate the top and bottom edges of said partition wall of said first insert member, said string means extending along the bottom wall of said casing member in said allocated storage space, and upwardly through an aperture in the partition wall of said second insert member, the opposite end of said string means extending outside said second insert member, said aperture being located in a position intermediate the top and bottom edges of the partition wall of said second insert member.

2. A storage container according to claim 1, wherein said casing member has a rectangular shape and wherein said top cover member has dimensions corresponding to the dimensions of said bottom wall.

3. A storage container according to claim 1, wherein said retaining members include a plurality of inwardly extending projections spaced along said partition walls of said insert members, each projection being fixed along one edge thereof to said partition wall; and wherein
two adjacent projections on said partition wall of one insert and corresponding two adjacent projections on said wall of said other insert define said allocated storage space.

4. A storage container according to claim 1, wherein each of said inserts further includes at least one horizontal wall substantially perpendicular to said partition wall and adapted to cover a space formed between said partition wall and said side wall of said casing member.

5. A storage container according to claim 4, wherein the opposite end of said string projects through an opening provided in said horizontal wall of said second insert member.

6. A storage container according to claim 5, wherein said inserts are U-shaped.

7. A storage container according to claim 2, further comprising a book-like assembly including a pair of substantially rigid planar members and a hinge member extending between said planar members, said planar members being secured to said bottom wall and said top cover.

8. A storage container according to claim 7, wherein said planar members have larger width and length dimensions than said bottom wall and said top cover.

9. A storage container according to claim 1, wherein said one end of said string is secured to the partition wall of said first insert member at about the same distance above the bottom wall of said casing member as is the aperture in said second insert member.

10. A storage container according to claim 1, wherein said second insert member is of lesser height than the side walls of the casing member, thereby providing space for accommodating the end of said string underneath said top cover.

* * * * *